United States Patent [19]

Shur

[11] Patent Number: 4,637,624

[45] Date of Patent: Jan. 20, 1987

[54] HYDRAULIC RIGHTING MOTORCYCLE KICKSTAND

[76] Inventor: Don Shur, P.O. Box 728, Cologne, N.J. 08213

[21] Appl. No.: 835,098

[22] Filed: Feb. 28, 1986

[51] Int. Cl.$^4$ .............................................. B62H 1/02
[52] U.S. Cl. ..................................... 280/298; 280/295; 280/304; 280/766.1; 280/763.1
[58] Field of Search .............. 280/293, 295, 301, 304, 280/289 R, 763.9, 766.1, 298; 180/219

[56] References Cited

U.S. PATENT DOCUMENTS

| | | | |
|---|---|---|---|
| 3,780,150 | 9/1976 | Gigli | 280/293 |
| 3,999,616 | 12/1976 | Crane et al. | 173/32 |
| 4,203,500 | 5/1980 | Kamiya | 180/219 |
| 4,223,906 | 9/1980 | Gratza | 280/301 |
| 4,377,295 | 3/1983 | Lemmon | 280/293 |

Primary Examiner—John J. Love
Assistant Examiner—Donn McGiehan
Attorney, Agent, or Firm—Thomas A. Lennox

[57] ABSTRACT

A hydraulic righting and kickstand device includes a pivotal connection to a centrally located lower frame of the motorcycle, an upper kickstand member extending downwardly toward the ground, a fluid actuated cylinder structurally connected to the upper kickstand member, a piston actuated rod actuated in the cylinder extending downwardly from the lower end of the cylinder, a foot member structurally connected to the piston rod and extending toward the ground to the support the cycle with fluid pressure being supplied to the cylinder extending the piston to right the motorcycle.

8 Claims, 10 Drawing Figures

HYDRAULIC RIGHTING MOTORCYCLE KICKSTAND

BACKGROUND OF THE INVENTION

This invention involves a righting device used in combination with or as part of a typical kickstand device supporting the motorcycle at a tilted angle toward the kickstand.

This invention also involves a fluid actuated cylinder to extend the kickstand length to right the motorcycle. Motorcycles vary widely in size, style and weight, but many of the cycles are extremely heavy and large, but yet are written by older persons and persons with limited strength. The motorcycle due to its general appeal and low cost of travel has become a popular vehicle for weekend trips by families. Many of these persons have limited physical strength and yet these trips usually involve the attachments of heavy storage containers on the back and sides of the vehicle which may be packed with a large supply of heavy food and equipment for the trip. In addition, many extra devices to provide comfort and safety on the cycle greatly increase the weight of the vehicle until it weighs many of hundreds of pounds. The typical kickstand extends from the left side of the cycle from a lower centrally located frame member at an angle toward the ground. When the cycle is parked, the stand is kicked downwardly into position and the cycle is rested at an angle on the stand. When the person is ready to use the motorcycle again, he or she must force the motorcycle into an upright position so that it no longer rest on the kickstand, then mount the motorcycle and kick the kickstand up to a horizontal position out of the way. If the person of limited strength and particularly if the ground is slightly angled toward the kickstand, the person may well be unable to right the cycle without straining or hurting his or her person.

There have been a number of devices used on motorcycles and other equipment to lower the kickstand, to prevent turnover or to reposition the kickstand. These include U.S. Pat. No. 4,223,906 to Peter Gratza which describes a device for lowering a kickstand on a motorcycle and at the same time to raise the back wheels off the ground. This device and none of the prior art devices approach the above described problem nor satisfy the needs and the objects detailed herein below.

SUMMARY OF THE INVENTION

It an objectof the present invention to provide a righting device to bring a motorcycle resting on a kickstand to a more upright position.

It is a further object of the present invention to provide a device which will allow a cycle to be safely brought to an upright position to prevent a person from losing control of the cycle and causing damage to the cycle or injury to the person.

It is a further object of the present invention to provide a combination kickstand and righting device which will allow the person to sit on the cycle while the cycle is still resting the kickstand and bring the cycle to a more upright position so that the rider can bring the cycle to a full normal position.

It is particular object of the present invention to provide a righting device which will bring a motorcycle almost but not quite to a normal position with the ground allowing the person to continue the righting process to the normal condition.

It is a particular object of the present invention to provide a righting device that will bring a cycle parked on a downward slope toward the kickstand so that the cycle can be brought to a more upright position allowing the person to bring the cycle to a full upright position with muscle power.

The invention includes a righting and kickstand device to support a motorcycle by connection with a lower intermediate frame section of the motorcycle with the device angled downwardly toward the ground to support the motorcycle tilted at an angle toward the device. The device includes a fluid actuated cylinder connected to the motorcycle with a pivot connection device. A piston rod extends from the cylinder with a foot device structurally attached to the lower end of the piston rod with the foot device designed to rest on the ground. A fluid pressure device is provided to supply fluid pressure to the cylinder to force the piston rod to its downward out stroke position.

DESCRIPTION OF PREFERRED EMBODIMENTS

The preferred righting device is used in combination with a kickstand device which together are used to support a motorcycle on the ground tilted at an angle toward the righting device. The kickstand device is pivotally connected to the motorcycle proximate to the center of the lower frame of the cycle and is capable of pivotally moving horizontally out of the way. The device further includes an actuated cylinder structurally connected as in intermediate section of the kickstand between an upward kickstand section pivotally connected to the motorcycle frame and lower foot section of the kickstand. A piston rod movably extends from the cylinder downwardly and is structurally connected to the foot section. A fluid pressure device is provided to supply fluid pressure to the cylinder to force the piston rod downwardly with the foot section against the ground forcing the motorcycle to a more upright position.

Another embodiment of the present invention is a righting device of a motorcycle to be pivotally connected to a centrally located lower frame of the motorcycle and including an upper kickstand member. The device further includes a pivot connection device to pivotally connect the upper end of the upper kickstand member to the lower frame member of the motorcycle. The pivotal connection allows the upper kickstand member to pivot downwardly to a vertical position supporting the motorcycle or to pivot upwardly toward the horizontal to be out of the way. The device further includes a fluid actuated cylinder structurally connected to the lower end of the upper kickstand member and extending downwardly generally in the direction of supporting the motorcycle. A piston rod is actuated in the cylinder extending downwardly from the lower end of the cylinder. A foot member is structurally connected to the exposed end of the piston rod and extends downwardly toward the ground for supporting the motorcycle. The device finally includes a fluid pressure to supply fluid pressure device to the cylinder.

Figure 1:
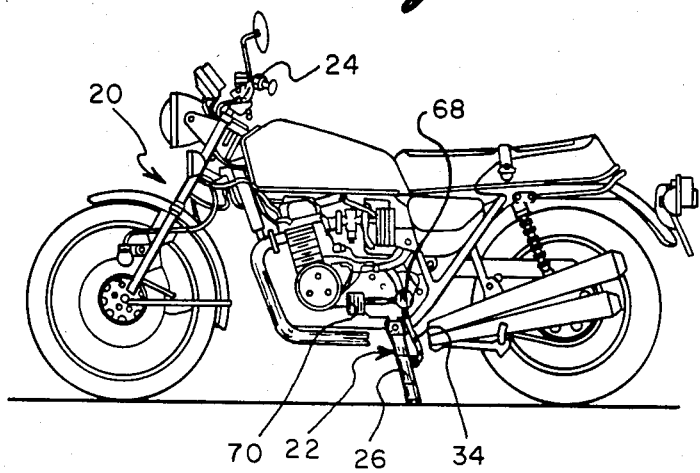
FIG. 1 is a side elevational view of a motorcycle with a hydraulic righting device of the present invention.

In FIG. 1, motorcycle 20 is shown supported by combination kickstand and hydraulic righting device 22 actuated by switch 24 on the handlebar which is a push button switch or like device which remains in the "on" position with pressure and turns off upon release after the righting process and the motorcycle has reached an acceptable upright position. After the motorcycle has reached upright position as a result of the righting device extending downwardly, release of switch 24 automatically returns cylinder 26 of device 22 to the starting position. Righting cylinder 26 automatically retracts so that when the kickstand is raised horizonally out of the way it is at normal length.

Figure 2:
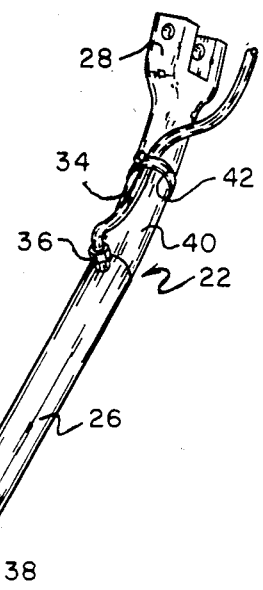
FIG. 2 is a perspective view of a righting device of the present invention.

Righting device 22 as illustrated in FIG. 2 is connected through standard pivot connection 28 which may be spring loaded to allow device 22 to be kicked to the rear of the cycle out of the way with muscle power or in the alternative powered by the device for lowering a kickstand described in the U.S. Pat. No. 4,223,906 to Peter Gratza assigned to Bayierische Motoren Werke Aktiengesellschaft, Fed. Rep. of Germany, incorporated herein by reference. Single action hydraulic cylinder 26 is powered through flexible pressure line 34 connected through standard brass fitting 36. Angled foot 38 is threadably connected to the lower end of a piston rod (hidden in this view) in hydraulic cylinder 26, which in turn is threadably connected at its upper end to upper kickstand section 40. Pressure line 34 is held in position with strap 42 to upper section 40 and similarly to other structural parts of motorcycle 20 as the line 34 is trained to the various components.

Figure 3:
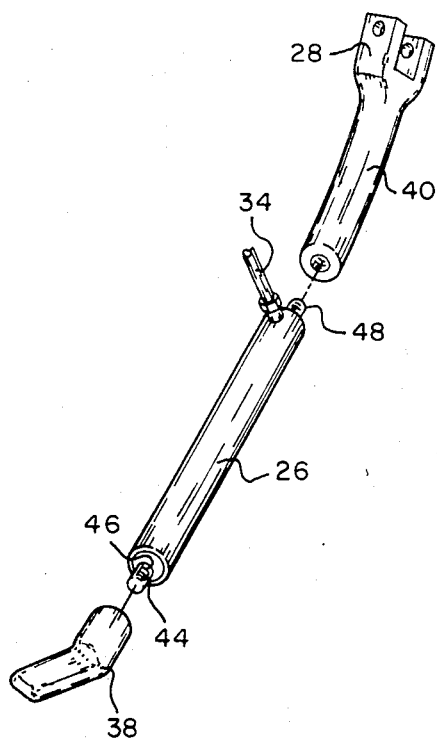
FIG. 3 is an exploded perspective view of the righting device illustrated in FIG. 2.

In FIG. 3, foot 38 is shown unscrewed from thread 44 of piston rod 46 which is forced downwardly when hydraulic pressure is exerted through pressure line 34 on cylinder 26. Upper kickstand section 40 is shown threadably disconnected from threads 48 extending from the upper end of cylinder 26.

Figure 4:
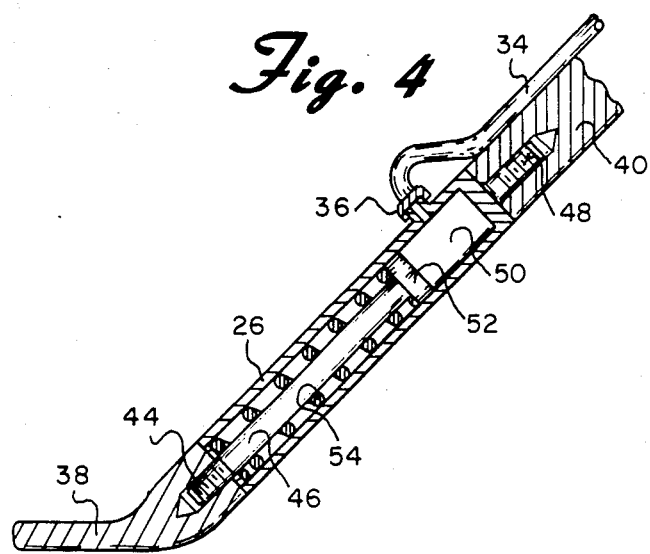
FIG. 4 is a vertical cross-sectional view along the center line of the righting device illustrated in FIG. 2.

In FIG. 4, with no hydraulic pressure exerted through line 34, into cylinder chamber 50, no pressure is exerted on piston 52 so that rod 46 remains in its upward position by spring pressure of spring 54 retaining foot 38 seated against the bottom end of cylinder 26.

Figure 5:
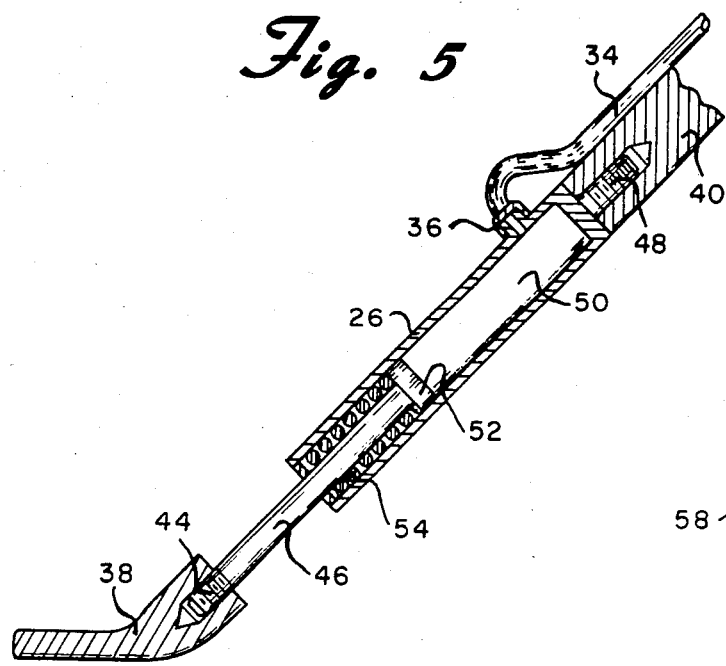
FIG. 5 is the same cross-sectional view of FIG. 4 with the piston rod extended.

In FIG. 5, hydraulic pressure has been exerted by fluid under pressure filling chamber 50 extending piston 52 connected to piston rod 46 to force foot 38 against the ground raising motorcycle 20 to the upright position. Upon release of pressure of the hydraulic fluid, spring 54 returns piston 52 to its starting position and forcing fluid outwardly through line 34 to a fluid reservoir and sump.

Figure 6:
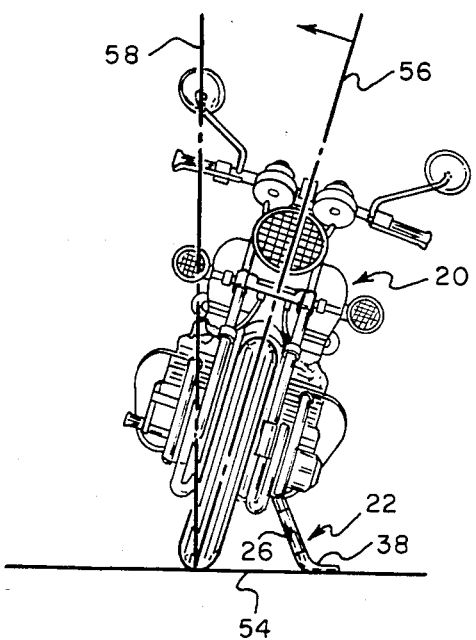
FIG. 6 is a frontal view of the motorcycle of FIG. 1 illustrating the performance of the righting device.
Figure 7:
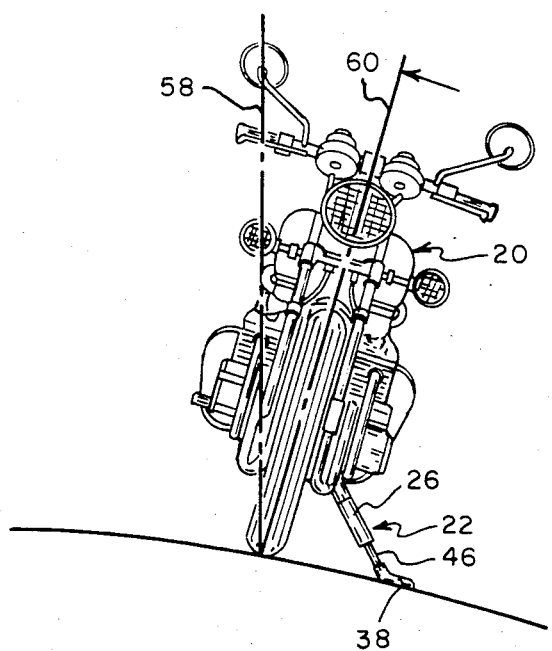
FIG. 7 is an illustration of the front view of the motorcycle of FIG. 1 parked on a sideways downward slope illustrating the performance of the righting device.

In FIG. 6, motorcycle 20 is shown standing on combination kickstand righting device 22 on flat surface 54. Hydraulic cylinder 26 is shown in its unactivated condition with the cycle canting to the side in its standard rest position. Upon activation, cylinder 26 will force foot 38 against service 54 and bring the vertical center line 56 up to and approaching vertical line 58, representing normal. It is preferred that the length and angle of device 22 bring cycle 20 almost to vertical but not past vertical when the cycle is sitting on a flat surface. Generally, cyclists are accustomed to righting the cycle from the kickstand side but have difficulties balancing from the other side while the cycle comes up from rest. Thus, wherever in the specification and claims the term "vertical" is used, it is intended to mean approaching normal if the cycle is resting on a completely flat surface. If the cycle is resting on a surface that drops downwardly towards the direction of device 22 bringing cycle 20 to "vertical" using righting device 22 will still leave the cycle tilted slightly downhill. However, having righted the cycle to that point, the driver can generally right the cycle the balance of the distance to a normal position. That situation is illustrated in FIG. 7 where piston rod 36 is extended by hydraulic pressure on cylinder 26 to bring cycle 20 up close to "vertical" 60 which, in reality, is still tilted from normal 58. The driver must use muscle power to right the cycle to normal line 58.

Figure 8:
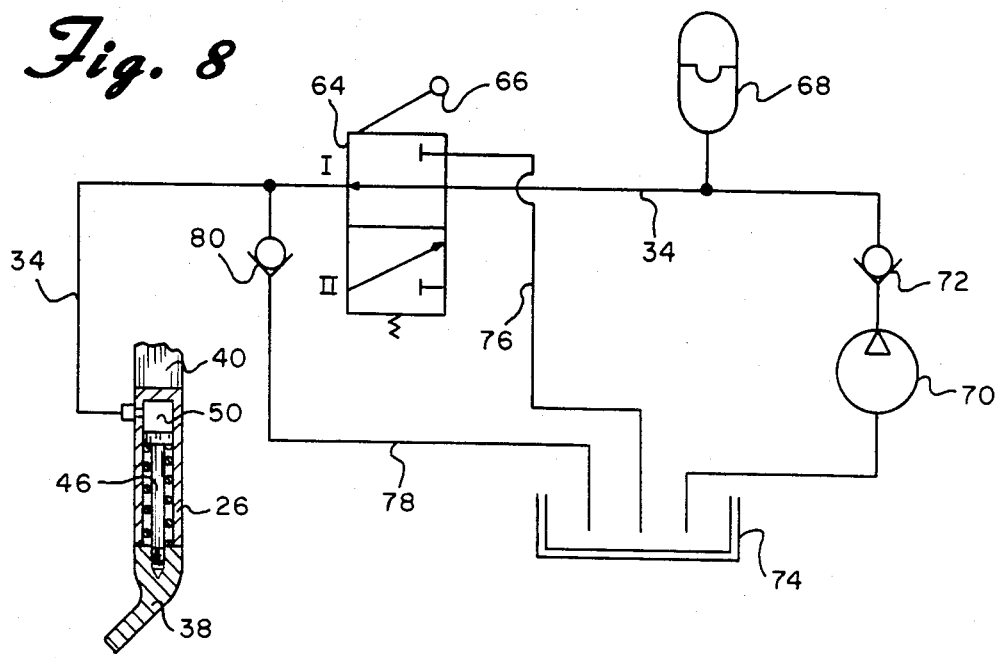
FIG. 8 is a schematic diagram of the hydraulic system of a device of the present invention.

In FIG. 8, hydraulic cylinder 26 is positioned to be actuated by forcing liquid into chamber 50 along pressure line 34. Control valve 64 is positioned by actuation of switch 66 to receive fluid from pressure reservoir 68 by pressure exerted from pump 70 in position "I". Line 34 between pump 70 and pressure reservoir 68 is equipped with check valve 72 and draws fluid from the upside of pump 70 from sump 74, which may be the brake fluid supply for cycle 20. When cycle 20 has been righted and switch 66 is released control valve 64 returns to position II wherein pressure is released and spring 54 forces fluid from chamber 50 through return line 76 to sump 74. For fluid losses, refill suction line 78 from sump 74 protected by check valve 80 refills any lost fluid.

Figure 9:
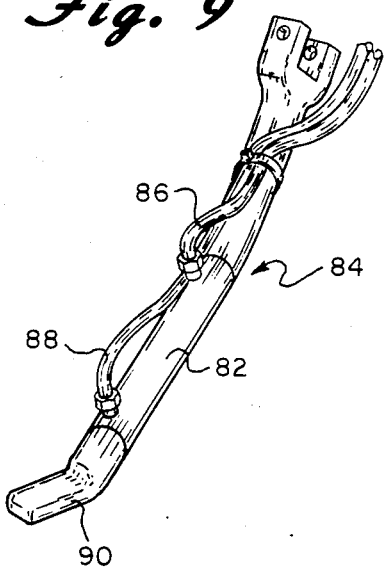
FIG. 9 is an alternate embodiment of a righting device of the present invention.
Figure 10:
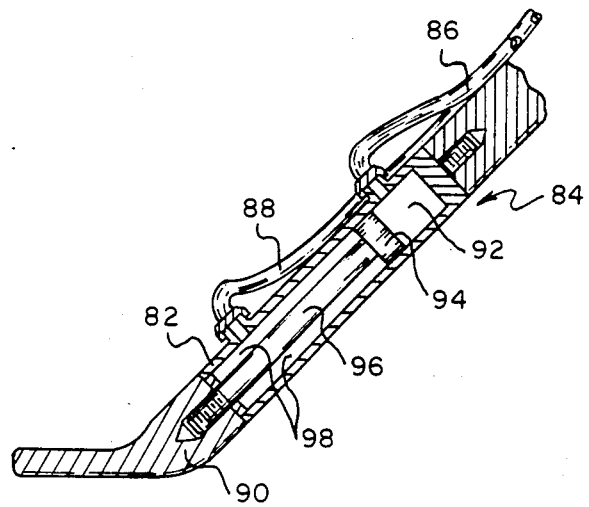
FIG. 10 is a vertical cross-sectional view of the device illustrated in FIG. 9.

In FIG. 9, a double acting cylinder 82 is incorporated in righting device 84. Cylinder 82 is equipped with actuation line 86 to feed fluid to cylinder 82 to extend foot 90 attached to the piston rod. Return line 88 is connected to cylinder 82 to provide fluid to force return of the piston and piston rod to carry foot 90 back to its starting position. As illustrated in FIG. 10, line 86 provides fluid to cylinder chamber 92 which forces piston 94 downwardly with piston rod 96 which is threadably connected to foot 90 righting cycle 20. Upon righting the cycle and release of the switch on through some alternative signal, pressure is released from the fluid in line 86 allowing it to flow back to the resevoir from chamber 92, while at the same time fluid pressure is exerted through line 88 to return chamber 98 which exerts pressure upwardly on piston 94 driving it upwardly to rest position with foot 90 seating against the bottom end of cylinder 82 while at the same time forcing fluid out of chamber 92 through line 86.

While this invention has been described with reference to the specific embodiments disclosed herein, it is not confined to the details set forth and the patent is intended to include modifications and changes which may come within and extend from the following claims.

I claim:

1. A righting device used in combination with a kickstand device used to support a motorcycle on the ground at a tilted angle wherein the kickstand device is pivotally connected to the motorcycle proximate to the center of a lower frame of the cycle, comprising:
   (a) a fluid actuated cylinder structurally connected as an intermediate section of the kickstand between an upper kickstand connection pivotally connected to the motorcycle frame and a lower foot section of the kickstand to rest on the ground,
   (b) a piston rod in the cylinder extendable downwardly and structurally connected to the foot section, and
   (c) fluid pressure means to supply fluid pressure to the cylinder to force the piston rod downwardly with the foot section against the ground to right the motorcycle.

2. The device of claim 1 wherein a cylinder spring means is placed is the fluid actuated cylinder to place a spring load on the cylinder when extended downwardly with fluid pressure to return the piston rod to starting position when the fluid pressure is released.

3. The device of claim 1 wherein the fluid actuated cylinder comprises two chambers, one chamber under fluid pressure to actuate the piston rod forcing it to extend out of the cylinder and a second chamber which under fluid pressure forces the piston rod to return to his original position unextended from the cylinder.

4. The device of claim 1 which further comprises a pressure actuated switch which under pressure actuates the fluid pressure means to force extension of the piston rod and upon release allows fluid pressure release and return of the piston rod to its unextended position.

5. A righting device for a motorcycle pivotally connected to a centrally located lower frame of the motorcycle, comprising:
   (a) an upper kickstand member,
   (b) a pivot connection means to pivotally connect the upper end of the upper kickstand member to the lower frame of the motorcycle,
   (c) a fluid actuated cylinder structurally connected to the lower end of the upper end of the kickstand member and extending downwardly generally in the direction of the ground for supporting the motorcycle,
   (d) a piston actuated rod actuated in the cylinder extendable downwardly from the lower end of the cylinder,
   (e) a foot member structurally connected to the rod and extending toward the ground for supporting the motorcycle and,
   (f) fluid pressure means to supply fluid pressure to the cylinder.

6. The device of claim 5 wherein a cylinder spring means is placed in the fluid ctuated cylinder to place a spring load on the cylinder when extended downwardly with fluid pressure to return the piston rod to starting position when the fluid pressure is released.

7. The device of claim 5 wherein the fluid actuated cylinder comprises two chamber, one chamber under fluid pressure to actuate the piston actuated rod forcing it to extend out of the cylinder and a second chamber which under fluid pressure forces the piston rod to return to his original position unextended from the cylinder.

8. The device of claim 5 which further comprises a pressure actuated switch which under pressure actuates the fluid pressure means to force extension of the piston actuated rod and upon release allows fluid pressure release and return of the piston actuated rod to its unextended position.

* * * * *